March 29, 1927.  S. S. KEMPF  1,623,014

TRACTION CHAIN

Filed Aug. 28, 1926

Inventor
S. S. KEMPF,
By Stevens and Batchelor
Attorneys

Patented Mar. 29, 1927.

1,623,014

UNITED STATES PATENT OFFICE.

STEPHEN S. KEMPF, OF CHICAGO, ILLINOIS.

TRACTION CHAIN.

Application filed August 28, 1926. Serial No. 132,122.

This invention relates to traction chains especially adapted for use in connection with automobiles.

Briefly stated, an important object of the invention is to provide a traction chain having simple means whereby the same may be constantly carried in a position to be applied to the traction or other ground engaging wheels of the automobile.

A further and equally important object of the invention is to provide a traction chain which may be applied by the operator from the operator's seat or other remote point whereby the operator may be relieved of the necessity of handling the chains and the possibility of soiling his or her hands or clothing.

Another aim of the invention is to provide a skid chain which when carried in position to be applied will be held against rattling and which will not detract substantially from the appearance of the automobile.

Other objects and advantages of the invention will be apparent during the course of the following description.

Figure 1:
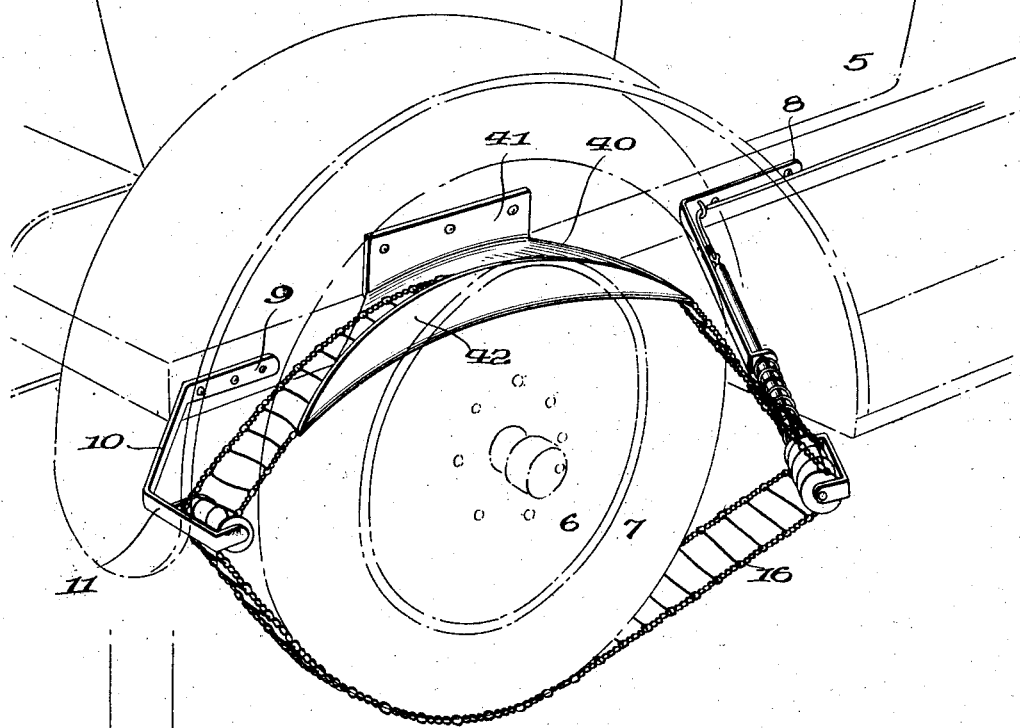
Figure 2:
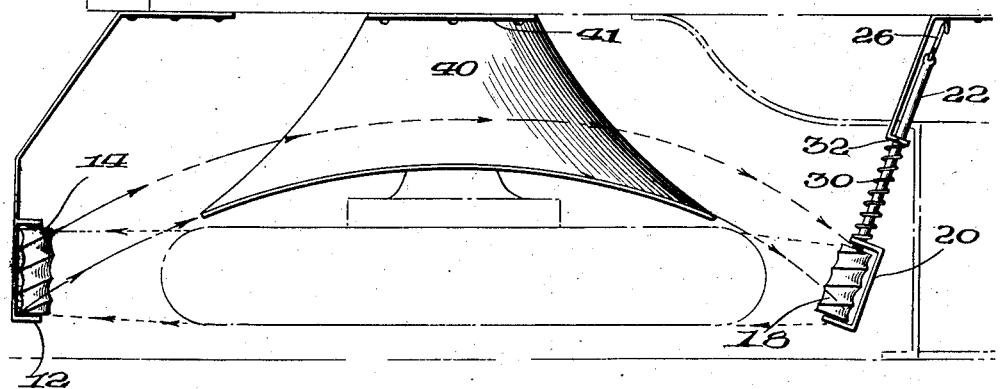

In the accompanying drawing forming a part of this application and in which like numerals are employed to designate like parts throughout the same, Figure 1 is a perspective of the improved traction chain applied and in its operative position, a portion of the rear end of an automobile being outlined in dotted lines to illustrate the relative position of the device to the vehicle;

Figure 2 is a fragmentary top plan view of the improved traction chain applied and in its operative position, parts being shown in dotted lines.

In the drawing, the numeral 5 designates a motor vehicle having a traction or other ground engaging wheel 6 provided with a tire 7.

In carrying out the invention the frame or other fixed part of the motor vehicle may be provided with front and rear brackets 8 and 9, respectively, the rear bracket 9 being provided with an outwardly directed intermediate portion 10 and a laterally directed terminal 11.

Figure 2 clearly illustrates that the terminal portion 11 is provided with inwardly directed apertured ears 12 to which a roller 14 is rotatably connected. An endless chain 16 is trained about the roller 14 and is trained about a second roller 18, the second roller being connected to a diagonally movable supporting member 20. Figure 2 clearly illustrates that the member 20 is of U-shaped formation and the roller 18 is mounted on an actuating rod 22, one end of which is connected with a cable or other operating device 26. The operating cable may extend from the driver's compartment or other convenient operating place and may be operated either by hand or foot.

Referring again to Figure 2, it will be seen that a coil spring 30 is confined between a guiding and supporting ear 32 of the forward bracket 8 and the supporting member 20 and the spring 30 tend to urge the roller 18 outwardly to an operative position.

When it is desired to disengage the chain 16 from the tire 7, it is merely necessary to exert a pull on the cable or other flexible element 26 whereby to draw the chain inwardly and forwardly. As the wheel continues to turn during the travel of the automobile, it will be engaged with the outer side of the chain 16 and will thereby force the chain inwardly. This in conjunction with the mechanical inward movement of the forward portion of the chain will permit of the disengagement of the chain from the wheel and will cause the chain to be moved up from the ground so that it will not in any way interfere with the movement of the vehicle.

Figure 1 illustrates that a guard 40 is attached to the frame or other support of the automobile through the medium of an attaching portion 41 and suitable fastening devices and is provided with an upwardly directed crescent shaped flange 42 by means of which the chain is spaced from the tire when it is in an inoperative position and by means of which the upper portion of the chain is constantly spaced from the adjacent portion of the tire.

With reference to the foregoing description taken in connection with the accompanying drawing, it will be apparent to those skilled in the art that the improved skid chain and the mounting means therefor permits of the application or removal of the chain without soiling the hands and without handling the chain. In fact, as previously stated, the chain may be applied or removed from a remote point such as the driver's seat.

An important feature of the invention also resides in the fact that the contact between the tire 7 and the chain is reduced to a minimum without in any way detracting from the traction area provided by the employment of the chain. Thus, wear on the tire as a result of the use of the chain is reduced to a minimum. Another advantage of this arrangement resides in the fact that slapping of the chain against the mud guard is overcome. Further, when the wheels are checked or locked by the brakes, the chain forms an efficient ground-friction element to effect a quicker stop.

Having thus described the invention, what is claimed is:

1. A traction device for automobile wheels comprising brackets, and rollers carried by the brackets, a chain trained about the rollers and adapted to engage an automobile wheel, a guard having means to constantly space a portion of the chain from the wheel, and means whereby one of said rollers may be moved with respect to the wheel to engage or disengage the chain from the wheel.

2. The combination with a vehicle traction wheel; of an endless traction chain engaged therewith, front and rear brackets, a roller carried by one of the brackets, a stem carried by the other bracket and having a roller movable laterally with respect to the plane of the wheel with which the chain is engaged, said first and second-named rollers being adapted to support the chain, and a spring normally holding said movable roller in operative position.

3. The combination with a vehicle traction wheel; of an endless traction chain engaged therewith, rollers having connection with the chain, a stem rotatably and movably supporting one of the rollers, and means connected to the stem for controlling the movement of the roller connected to the stem from a remote point, and a guard having a flange constantly spacing a portion of the chain from the wheel.

4. The combination with a vehicle traction wheel; of an endless traction chain engaged therewith, rollers having connection with the chain, a stem rotatably and movably supporting one of the rollers, and means connected to the stem for controlling the movement of the roller connected to the stem from a remote point, and a guard having a flange constantly spacing a portion of the chain from the wheel, said roller carried by the stem being movable laterally with respect to the plane of the wheel with which the chain is engaged.

5. A traction device comprising a chain adapted to be engaged with a vehicle traction wheel, separate guide means supporting said chain for movement in the direction of its length, one of said guide means being movable laterally with respect to the plane of the wheel to engage or disengage the chain from the wheel.

6. A traction device comprising an endless traction chain adapted to be engaged with a vehicle traction wheel, separate guide means having connection with the chain, a stem supporting one of said guide means for movement laterally with respect to the plane of the wheel, and means connected to said stem for controlling the movement of said movable guide means from a remote point.

7. A traction device comprising an endless traction chain adapted to be engaged with a vehicle traction wheel, separate guide means having connection with the chain, a stem supporting one of said guide means for movement laterally with respect to the plane of the wheel, means connected to said stem for controlling the movement of said movable guide means from a remote point, and means for normally holding said movable guide means in an operative position.

In testimony whereof I affix my signature.

STEPHEN S. KEMPF.